Jan. 10, 1928.
C. R. NICHOLS
1,655,819
CALCULATING DEVICE
Filed Oct. 19, 1923
3 Sheets-Sheet 1
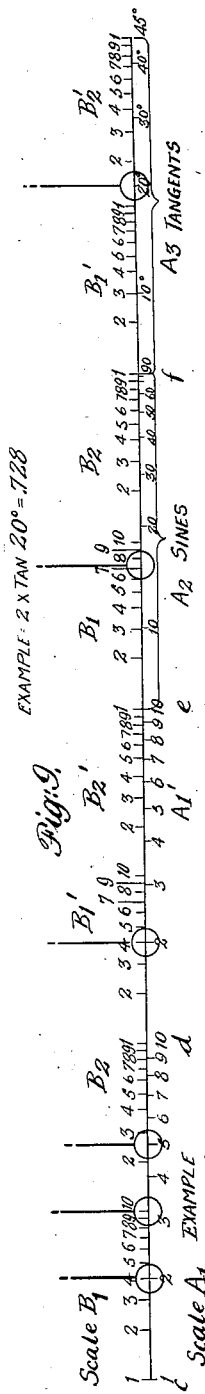
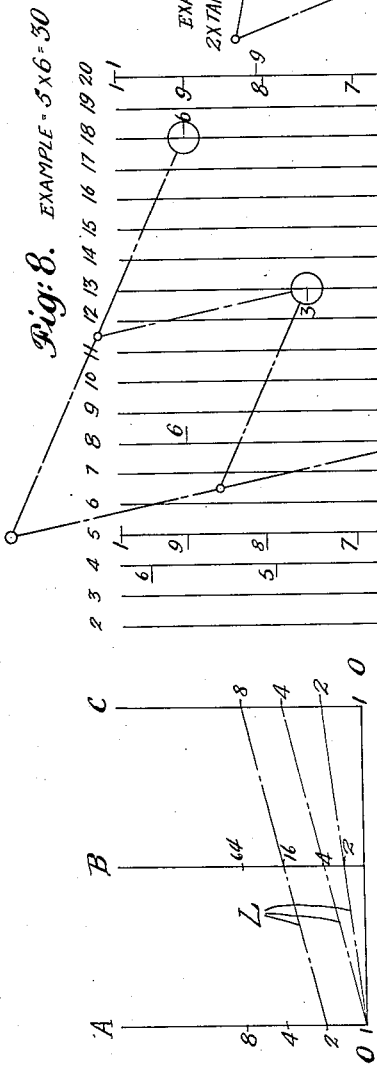
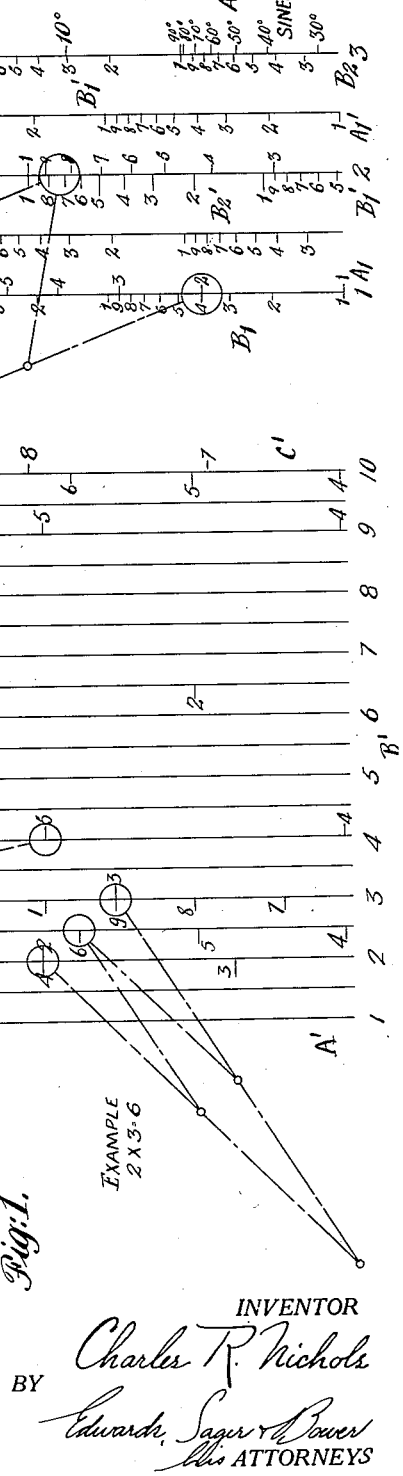
INVENTOR
Charles R. Nichols
BY
Edwards, Sager & Bower
his ATTORNEYS

EXAMPLE
312 × 26 = 812

Jan. 10, 1928.
C. R. NICHOLS
1,655,819
CALCULATING DEVICE
Filed Oct. 19, 1923
3 Sheets-Sheet 3
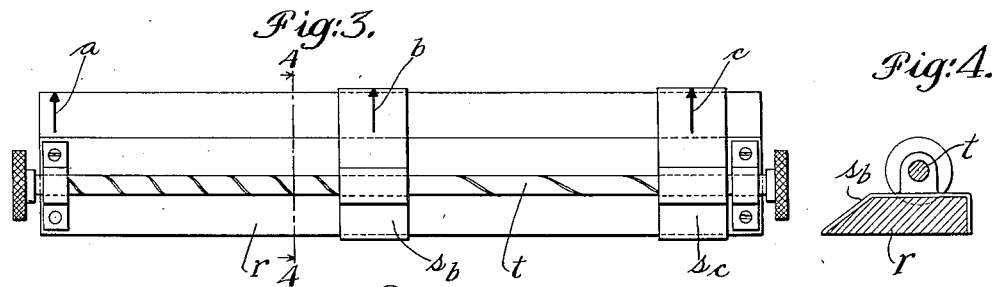
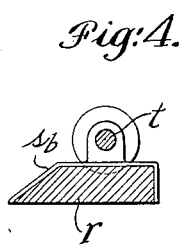
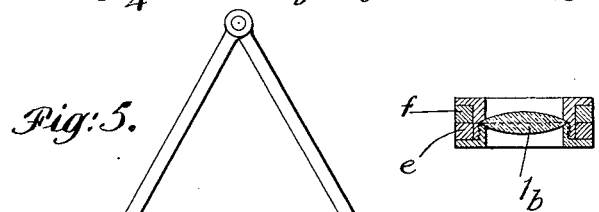
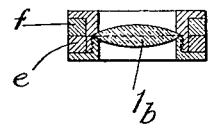
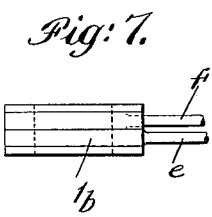
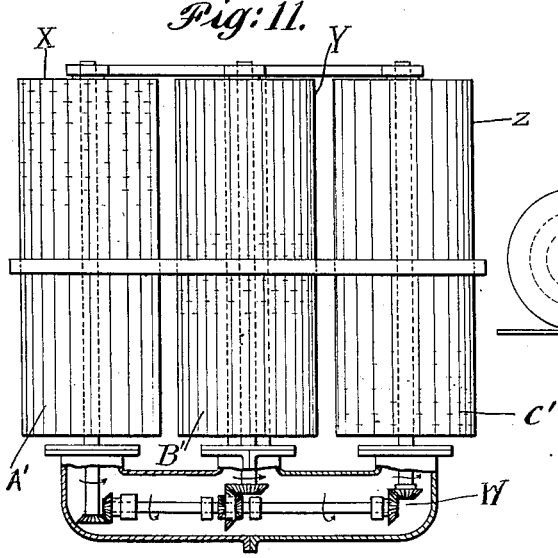
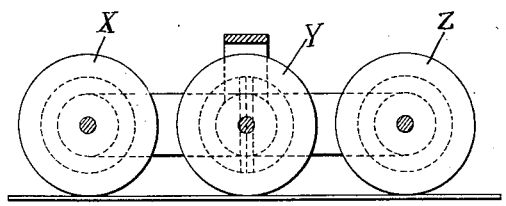
INVENTOR
Charles R. Nichols
BY
Edward Sager & Bower
his ATTORNEYS Patented Jan. 10, 1928.

1,655,819

UNITED STATES PATENT OFFICE.

CHARLES RODNEY NICHOLS, OF MARACAIBO, VENEZUELA.

CALCULATING DEVICE.

Application filed October 19, 1923. Serial No. 669,464.

This invention relates to calculating instruments and particularly to instruments for performing the various logarithmic operations of multiplication and division and calculations involving powers, roots, proportions, trigonometric functions, etc. The chief object of the invention is to provide a device which is quick and simple in operation and easily and accurately readable for a relatively large number of decimal places, that is, significant figures.

Prior instruments have either been very limited in the number of decimal places determinable, as in the case of the ordinary slide rule, or they have involved expensive and cumbersome complications in attaining greater accuracy as, for instance, in the case of Thacher's calculating instrument.

The device of this invention attains both simplicity in construction and operation and a high degree of accuracy in the reading of the result. According to the principles of this invention logarithmic scales are combined together in a manner permitting them to be divided into compactly arranged sections giving great length to the scales within conveniently limited space, the calculations being performed by a member moving into various positions on the scales to give the desired solution.

In the accompanying drawings illustrating the invention

Fig. 1 is a diagram illustrating in convenient form one relative arrangement of the logarithmic scales.

Fig. 3 is a plan view of one form of member adapted for cooperation with the scales shown in Fig. 2.

Fig. 4 is a section on line 4—4 of Fig. 3.

Fig. 5 is a plan view of another form of member adapted for cooperation with the scales of Fig. 2.

Figs. 6 and 7 are views of details of Fig. 5.

Figs. 8, 9 and 10 are views similar to Fig. 2 illustrating further embodiments of the invention, and Figs. 11 and 12 are elevational and sectional views respectively of another form of apparatus embodying the invention.

Figure 2:
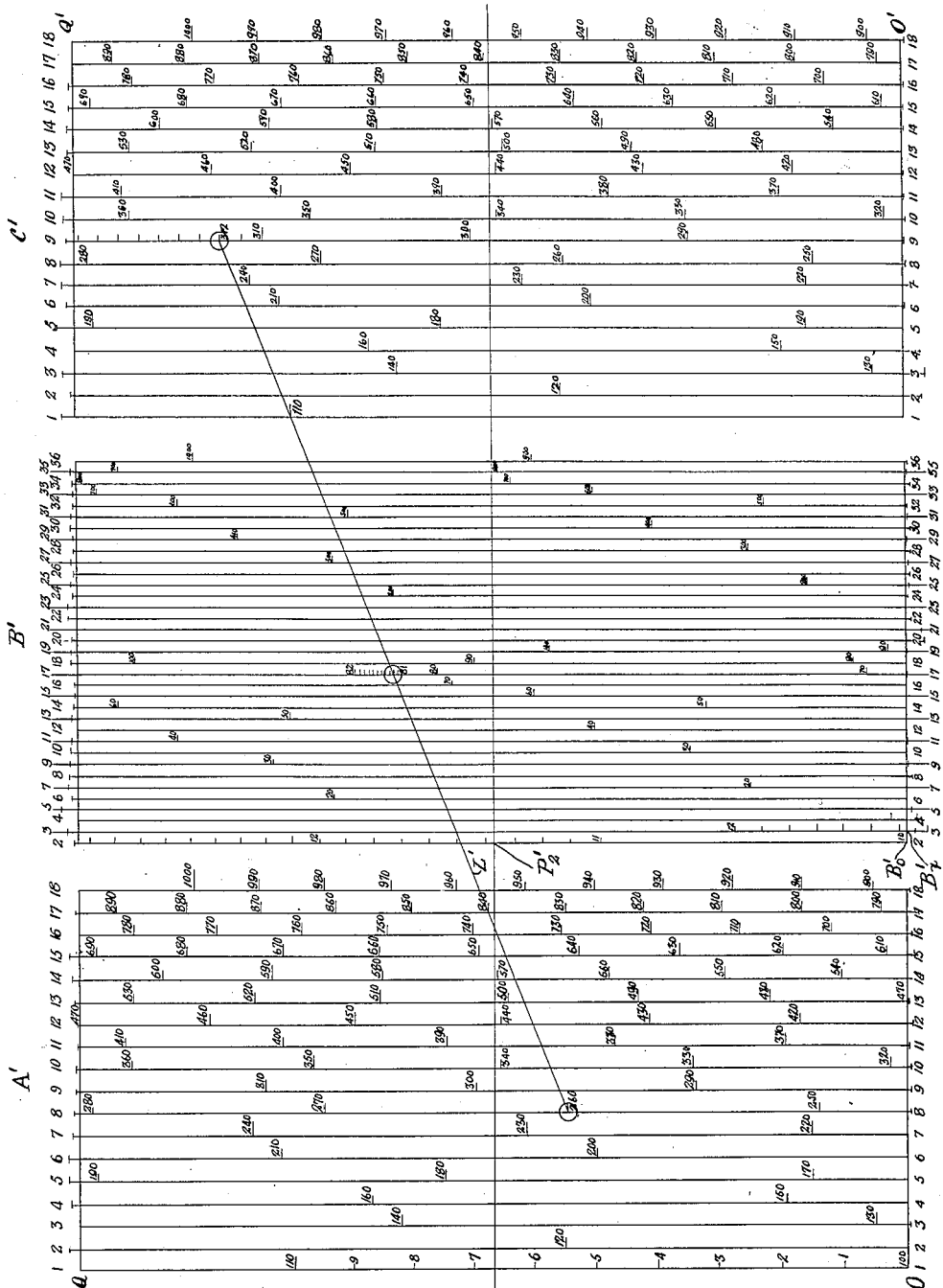
Fig. 2 is a similar view more in detail of a device embodying the invention.

In describing the invention reference will first be made to Fig. 1 in which diagram the two parallel lines A and C may be provided with logarithmic scales; in each scale the divisions are marked off a distance from the line 0 proportionate to the logarithm of the numbers marked alongside of the scale divisions. Thus the point marked 2 in each scale is spaced from 0 a distance of .301030 times the total number of units of any desired modulus and similarly the point marked 8 is .903090 times the total number of modulus units from 0. For example, suppose that the modulus chosen is 100 centimeters (that is the total logarithmic scale 1 to 10 is 100 centimeters long) then the point marked 2 is 30.1030 centimeters from 0 and the point marked 8 is 90.3090 centimeters from 0. Now if line B is at the middle exactly parallel to and equidistant from A and C then a straight line L intersecting A and C will intersect B at a distance from 0 which is equal to half the sum of the intersections on A and C. If therefore the line B should be provided with a logarithmic scale similar to that of A and C then line L will cross the line B at a point corresponding to the square root of the product of the number intersected on A by the number intersected on C. Thus a line from $A_0$ to 2 on C would cross B at $\sqrt{2}$ and similarly a line from $A_0$ through such an assumed point 2 on line B would intersect C at $2^2$. In this way the squares and square roots of single numbers or multiplied numbers could be obtained at a single setting of a single line—for instance a hair line on a transparent rule.

Usual calculations are not ordinarily so concerned with operations involving roots and squares of products and dividends as with the products and dividends themselves. To make the scale of line B read directly the product of two numbers instead of in the square root thereof it is only necessary to change the modulus of the scale of B so that its modulus is one-half the modulus of scales A and C and its units are half the size of the units used in setting off the scales of the lines A and C. Then the numbers of the new scale will be the squares of the similarly situated numbers on the formerly assumed scale and scale B will read directly the product of the intersections of the line L with scales A and C. The numbers of scale B furthermore will be the squares of the numbers of scales A and C and hence squares or square roots may be directly read off by running line L through the same number on scales A and C.

In Fig. 1 scale B is marked to this scale of squares so that point 4 on B is spaced from 0 the same distance as the point 2 is on scales A and C and similarly the point 8 on A and C corresponds to 64 on B. To multiply two by eight the line L is run through 2 on scale A or C and through 8 on scale C or A; in either case it will intersect scale B at 16. To divide 16 by 2 or 8 the line L is run through 16 on B and through 2 on A or C or 8 on A or C the result 8 or 2 being read off in either case on C or A.

The arrangement of single line scales above set forth is advantageous in permitting calculations to be made by a single setting of a single straight line member and in accordance with the principle of this invention the scales A, B and C may be lengthened to any desired extent and divided into sections to give the utmost accuracy within conveniently limited space in setting and reading figures involving a large number of significant figures or decimal places. As shown in Fig. 2 the scales A' and C' are composed of a series of sections arranged as parallel lines with the scale divisions marked in sequence from the beginning of the first line to the end of the last, the total effective length of each scale being the sum of its sections between lines 0—0' and Q—Q'. Thus with eighteen lines (as shown in Fig. 2) the size of the modulus for the scale used is eighteen times as large as the modulus for a single line between lines 0—0' and Q—Q' and the accuracy of the readings is correspondingly increased. The scale B' is also correspondingly divided into eighteen sections numbered 2, 4, 6, 8, 10, etc., to 36 and has auxiliary intermediate sections unevenly numbered 3, 5, 7, etc., to 35. Each evenly numbered section 2, 4, etc., of scale B' is half way between an evenly numbered line on scale A' and an evenly numbered line on scale C' or between an unevenly numbered line on scale A' and an unevenly numbered line on scale C'. Each unevenly numbered section of scale B' falls half way between an evenly numbered line of scale A' and an unevenly numbered line of scale C' or between an unevenly numbered line of scale A' and an evenly numbered line of scale C'. Thus for every pair of lines, one from scale A' and one from scale C', there is an intermediate line of scale B' exactly half way between them and numbered as the sum of the number of the line of scale A' plus the number of the line of scale C', thus making a sub-combination of three equally spaced parallel lines diagrammatically explained in connection with Fig. 1. The modulus of the scale B' is (as in B of Fig. 1) one half of that of the scales A' and C' so that its unit is half as large and its numbers are the squares of the correspondingly placed numbers of scales A' and C'. The sections 1—18 of scales A' and C' are each started from line 0' as equal length segments taken consecutively along the scale but it is not necessary to have the last of these segments terminate at the logarithmic end 1000 of the scale. This end of the scale may, for instance, fall as shown in Fig. 2 somewhat short of the last upper end section 18. Similarly the sections may for convenience be irregularly extended at their upper and lower ends to complete desired divisions, as shown in Fig. 2. The lines 2, 4—36 of scale B' are similarly formed with the one half modulus scale starting with 10 corresponding to logarithmic mantissa 0 at point $B_0'$; and the lines 3, 5—35 of scale B' are similarly formed with the one half modulus scale starting from point $B_x'$ at the point of the scale corresponding to the linear midpoint $p_2$ of the first line (2) of scale B'. In the example given in Fig. 2 this midpoint is 11377. With this method of formation it is obvious that each line 3, 5—35 of scale B' begins at the linear middle point of the preceding section 2, 4—34 duplicating at the bottom the upper half of said preceding section. These lines 3, 5—35 may be said to be fitted between the lines 2, 4—36 and at the top duplicating the lower half of the succeeding section 4, 6—36. It is not necessary that the sections of a scale shall be equidistant. They must follow some regular system of spacing of course but might, for example, have the distance between sections decrease or increase from left to right. Length of segments need not be constant either.

In using this device for instance to multiply 26 by 312 the left end of straight line L' may be placed on point 26 of line 8 of scale A' and the right end of line L' on point 312 of line 9 of scale C' and the result 8112 will be read to all four places on line 8+9, or line 17, of scale B' on a chart in which the scale sections are eighteen inches in height. On the lower portions of such a scale it is possible to read the result to five and even six figures with accuracy.

In determining the line of scale B' which must be looked to for the result of any given operation the above method utilizes the sum of the numbers of the lines on A' and C'. This computation may be dispensed with by constructing the device providing the straight line relation L' so as to automatically indicate the proper line on scale B'. For instance in Figs. 3 and 4 the straight bar r may have fixed lines a for scale A' and lines b and c on slides $s_b$ and $s_c$ for scales B' and C' respectively. These slides are threaded onto a shaft t having a helical screw thread of one pitch for slide $s_c$ and another thread of half this pitch for slide $s_b$. With the slide $s_b$ set so that its lines b are midway between lines a and c then this relation is maintained for all settings of the slide $s_c$. With this device the ends of lines $a$, $b$, $c$ are in the same straight line and line $b$ will always indicate to the result on scale $B'$ or the line $c$ will indicate the result on scale $c$ in inverse operations.

Another device for accomplishing this result is shown in Figs. 5 and 6, providing three lenses $1_a$, $1_b$, $1_c$ always kept equidistant and in the same straight line by linkages $d$, $e$, $f$ and $g$ pivoted together so as to permit the lenses to be spread to the desired figures on the chart. Each lens carries marking indicating the central point of the lens and when any two lenses are positioned on their respective numbers of a problem the third lens will by its point indicate the third number or angle to which is the result desired.

Scales A and C do not have to have the same modulus and the relative spacing of the scales A, B, C may be altered so as to give a 1 to 2 or 1 to 3 or any other instead of the simpler 1 to 1 ratio adopted in the above examples, and the markings of any or all of the scales may instead of numbers be in terms of trigonometric functions, angles, logarithms or any other system adapted for special use. Various auxiliary scales may also be added for instance to give higher powers and roots or other functions of the systems of scales A, B, C. For example adding a log log scale (the logarithm of the logarithm of a number) to scale C will enable us to read any roots and any powers of numbers. For $\log x^n$ equals $n \log x$. Then $\log (n \log x)$ equals $\log n$ plus $\log \log x$. Then set $n$ on scale A and $x$ on the log log scale on C and read the result ($x^n$) on scale C. Invert the operation to read roots. Other scales D, E might be combined with the scales shown (see Fig. 2), scale D might lie to the left of $A'$ for instance and E to the right of $C'$. The results of calculations on scales D and E may then be read from scale $B'$. Or auxiliary scale D may lay above $A'$ while scale E lies below $C'$ and again the results of calculation on the scales D and E will be read off on the scale $B'$.

The segments of the logarithmic scales may be arranged at right angles to the segments as shown in Fig. 2, this being equivalent to placing scale $A'$ above the scale $B'$ and scale $C'$ below scale $B'$. Or the scales might each be turned through a certain angle such as 45° or a combination of any of these arrangements might be used which would permit using a number of special functional scales in combination. In any of these cases the chart would function exactly as before, some desired regular relation being maintained between the lines of the respective scales.

In Figs. 8, 9 and 10 further and preferred embodiments of the invention are shown involving a super-position of logarithmic scales side by side along the same or adjacent lines. Referring to Fig. 8 this form of the device is constructed by super-imposing scales $A'$ and $C'$ (Fig. 2) upon scale $B'$. In other words, scales $A'$ and $C'$ (Fig. 2) have been moved closer and closer together until they meet at the center and coincide with alternate lines in scale $B'$. The graduations of scale $A'$ are placed at one side of these lines while the graduations of scale $C'$ are placed on the other side of the lines. Calculations can be made in exactly the same manner as upon the chart shown in Fig. 2, since the product of two numbers always lies half way between the two numbers. In using the three lens arrangement for a reading device as shown (Fig. 8) for instance to multiply 5 by 6 the product 30 will be read off on the central lens but in order to multiply two numbers that are very close together, it is necessary to duplicate the set of scales shown in Fig. 8 so as to provide two such sets of scales side by side, then any desired calculation may be provided for and the device as a whole will occupy only about two thirds of the space occupied by the three scales of Fig. 2.

A straight line embodiment of the principles of the invention is shown in Fig. 9. From $c$ to $d$ in this device of Fig. 9 a logarithmic scale $A_1$ is provided below two logarithmic scales $B_1$ and $B_2$ of one half the modulus of scale $A'$. If two numbers to be multiplied are set off on scale $A_1$ their product can be read from scales $B_1$, $B_2$ at a point half way between the two numbers to be multiplied. Thus $2 \times 5 = 10$ in the example shown in the drawing. From $d$ to $e$ the scales $A_1$, $B_1$ and $B_2$ are duplicated at $A_1'$, $B_1'$ and $B_2'$ to enable two numbers of nearly the same value to be set off on scales $A_1$, $A_1'$ by means of the three lens device. In this case also the product of the two numbers can be read off from the scales $B_1$, $B_2$, $B_1'$, $B_2'$ at a point one half way between the numbers. From $e$ to $f$ the scales $B_1$, $B_2$ are repeated and the lower divisions of scale $A_2$ are marked off as the signs of angles instead of numbers. From $f$ to $g$ the scales $B_1'$ and $B_2'$ are repeated and scale $A_3$ is marked off as the tangents of angles. It is, of course, not necessary that the modulus of scales $B_1$, $B_2$, $B_1'$, $B_2'$ be one half of the modulus of scale $A_1$. Changing the ratio of the two moduli means changing the position of the middle lens accordingly. In Fig. 10 the straight line device of Fig. 9 is shown cut into segments arranged side by side in parallel compact form, there being, of course, two lines for the scales $B_1$, $B_2$ for each line of the scale $A_1$. If the modulus of scale $B_1$, $B_2$ were two thirds of the modulus of scale $A_1$, instead of one half, it would be necessary to have two instead of one intermediate segment between each pair of segments of scale $A_1$ and the middle lens of the three lens device would be spaced from the left lens a distance equal to two thirds of the distance between the two opposite lens.

Another embodiment of apparatus utilizing the principles of this invention is shown in Figs. 11 and 12 in which the three rollers X, Y, Z are arranged side by side with their axes parallel. Each roller X, Y, Z has wrapped around its cylindrical surface a scale corresponding to scale A', B' or C' respectively, the segments of each scale being parallel to the axis of the roller on which it is wound. Numbers can be set on scales A' and C', the proper segment on scale B' being determined by adding the numbers of the segments used on scales A' and C' and the result read by means of a hair line as in Fig. 1. The three rollers X, Y, Z are preferably intergeared, as indicated, by differential mechanism W, so that the proper segment on the third scale will always be automatically brought to the front when the other two rollers are rotated.

I claim:—

1. A calculating device comprising a plurality of logarithmic scales each comprising a series of parallel line sections of the same scale, and a member adapted to move to various angular positions with respect to said scales and adapted to indicate in a single position the calculation and the result of the calculation.

2. A calculating device comprising a plurality of logarithmic scales each comprising a series of parallel line sections of the same scale, and a member adapted upon relative movement between said scales to various angular positions with respect to said scales and adapted to indicate in a single position the calculation and the result of the calculation.

3. A calculating device comprising a plurality of logarithmic scales each comprising a series of parallel line sections of the same scale, a scale between said plurality of scales, and a movable member adapted to move to various angular positions with respect to said first mentioned scales and adapted to indicate in a single position the calculation and the result of the calculation at a point on said scale between said first mentioned scales.

4. In a calculating device the combination with a plurality of scales each scale comprising a plurality of parallel equally spaced straight line sections of the same scale, of a single member movable to different positions on said scales and having indicating means intersecting the result comprising means for permanently maintaining three points in a straight line.

5. In a calculating device the combination with a plurality of scales each scale comprising a plurality of parallel equally spaced straight line sections of the same scale, of a member movable to different positions on said scales and having indicating means automatically moving to point to the result when said member is positioned to indicate the calculation on said scales.

6. In a calculating device the combination with a plurality of scales each scale comprising a plurality of parallel equally spaced straight line sections of the same scale, of a member movable to different angular positions on said scales and having indicating means intersecting the result when said member is positioned to indicate the calculation on said scales.

7. In a calculating device the combination with a plurality of scales each scale comprising a plurality of parallel equally spaced straight line sections of the same scale, of a member movable to different angular positions on said scales and having indicating means automatically moving to point to the result.

8. In a calculating device the combination with scales each comprising a series of numbered parallel lines, of a member adapted to be set with relation to points on certain lines of said scales and automatically intersecting the result on another of said scales at a line thereon numbered in a manner corresponding to the setting of said member on said points.

9. In a calculating device the combination with scales each comprising a series of numbered parallel lines, of a member adapted to be set with relation to points on certain lines of said scales and automatically intersecting the result on another of said scales at a line thereon numbered to be the sum of the numbers of the lines containing said first mentioned points.

CHARLES RODNEY NICHOLS.